(12) United States Patent
Wetherell

(10) Patent No.: US 10,343,254 B2
(45) Date of Patent: *Jul. 9, 2019

(54) CONCRETE CUTTING, POLISHING, AND COLORING TREATMENT SOLUTIONS AND METHODS

(71) Applicant: Global Polishing Systems, LLC, Henderson, NV (US)

(72) Inventor: Mark Wetherell, Henderson, NV (US)

(73) Assignee: Global Polishing Systems, LLC, Henderson, NV (US)

( * ) Notice: Subject to any disclaimer, the term of this patent is extended or adjusted under 35 U.S.C. 154(b) by 86 days.

This patent is subject to a terminal disclaimer.

(21) Appl. No.: 15/592,122

(22) Filed: May 10, 2017

(65) Prior Publication Data

US 2017/0239781 A1  Aug. 24, 2017

Related U.S. Application Data

(63) Continuation-in-part of application No. 14/725,292, filed on May 29, 2015, now Pat. No. 9,662,757, which is a continuation of application No. 14/171,608, filed on Feb. 3, 2014, now Pat. No. 9,073,165.

(60) Provisional application No. 61/759,879, filed on Feb. 1, 2013.

(51) Int. Cl.
| | |
|---|---|
| *B24B 1/00* | (2006.01) |
| *B24B 7/18* | (2006.01) |
| *B24B 7/22* | (2006.01) |
| *B28D 1/20* | (2006.01) |
| *B24B 37/04* | (2012.01) |
| *C04B 41/00* | (2006.01) |
| *C04B 41/50* | (2006.01) |
| *C04B 41/68* | (2006.01) |
| *E04F 15/12* | (2006.01) |
| *E04F 21/24* | (2006.01) |
| *C04B 41/72* | (2006.01) |
| *E04B 5/16* | (2006.01) |

(52) U.S. Cl.
CPC .............. *B24B 37/044* (2013.01); *B24B 1/00* (2013.01); *B24B 7/18* (2013.01); *B24B 7/186* (2013.01); *B24B 7/22* (2013.01); *B24B 7/226* (2013.01); *B28D 1/20* (2013.01); *C04B 41/009* (2013.01); *C04B 41/5089* (2013.01); *C04B 41/68* (2013.01); *C04B 41/72* (2013.01); *E04B 5/16* (2013.01); *E04F 15/12* (2013.01); *E04F 21/24* (2013.01); *E04F 21/248* (2013.01); *B24B 1/007* (2013.01)

(58) Field of Classification Search
CPC .. B24B 1/00; B24B 1/007; B24B 7/18; B24B 7/22; B24B 7/224; B24B 7/226; B24B 7/186; B24B 37/042; B24B 37/044; B28D 1/00; B28D 1/20; E04F 21/24
See application file for complete search history.

(56) References Cited

U.S. PATENT DOCUMENTS

| | | |
|---|---|---|
| 3,976,497 A | 8/1976 | Clark |
| 4,098,363 A | 7/1978 | Rohde et al. |
| 4,232,980 A | 11/1980 | Tertinek et al. |
| 4,303,136 A | 12/1981 | Ball |
| 4,330,446 A | 5/1982 | Miyosawa |
| 4,452,324 A | 6/1984 | Jurgens |
| 4,471,845 A | 9/1984 | Jurgens |
| 4,606,418 A | 8/1986 | Thompson |
| 4,788,509 A | 11/1988 | Bahl et al. |
| 4,852,671 A | 8/1989 | Southland |
| 4,883,132 A | 11/1989 | Tibbitts |
| 4,913,244 A | 4/1990 | Trujillo |
| 5,355,954 A | 10/1994 | Onan et al. |
| 5,356,671 A | 10/1994 | Drs |
| 5,370,919 A | 12/1994 | Fieuws et al. |
| 5,431,852 A | 7/1995 | Kaijou |
| 5,695,811 A | 12/1997 | Andersen et al. |
| 5,750,276 A | 5/1998 | Page |
| 5,895,688 A | 4/1999 | Bertoncini et al. |
| 5,945,169 A | 8/1999 | Netti et al. |
| 6,155,907 A | 12/2000 | Jones |
| 6,187,851 B1 | 2/2001 | Netti et al. |
| 6,347,456 B1 | 2/2002 | Jones et al. |
| 6,454,632 B1 | 9/2002 | Jones et al. |

(Continued)

FOREIGN PATENT DOCUMENTS

| | | |
|---|---|---|
| JP | 2004314328 | 11/2004 |
| JP | 2009-114047 | 5/2009 |
| WO | WO 2004/035473 | 4/2004 |
| WO | WO 2013/049324 | 4/2013 |

OTHER PUBLICATIONS

"Basic know-how about silica", eka Industrial Specialties—Questions and Answers, Brochure, EKA Chemical Brochure, https://web.archive.org/web/20060617043238/http://www.colloidalsilica.com/eka.asp, © Copyright 2002 Eka Chemicals, Industrial Specialties, Mar. 21, 2006, 8 pages.

"Lythic™ Solutions for Polished Concrete—The Difference in Densifiers™", Lythic™, http://thesherwoodgroup.com/websites/lythic, © 2008 Lythic Solutions, Inc., date unknown, 1 page.

(Continued)

*Primary Examiner* — Timothy V Eley

(74) *Attorney, Agent, or Firm* — Weide & Miller, Ltd.

(57) ABSTRACT

Systems and methods for treating concrete, which includes the steps of wetting a surface of concrete with colloidal silica, allowing time for the colloidal silica to penetrate the concrete surface, and cutting the surface of the concrete with a bladed or segmented tool wherein the longitudinal blade or edge portion is positioned approximately at an angle between 30 degrees and 90 degrees relative to the surface of the concrete.

13 Claims, 3 Drawing Sheets

(56) References Cited

U.S. PATENT DOCUMENTS

| | | | |
|---|---|---|---|
| RE38,364 | E | 12/2003 | Wetherell et al. |
| 6,800,130 | B2 | 10/2004 | Greenwood et al. |
| 7,013,973 | B2 | 3/2006 | Danican et al. |
| 7,255,513 | B2 | 8/2007 | Lampley et al. |
| 7,588,090 | B2 | 9/2009 | Dairon et al. |
| 7,737,195 | B2 | 6/2010 | Gimvang |
| 7,775,741 | B2 | 8/2010 | Copoulos |
| 8,092,588 | B2 | 1/2012 | Bowers |
| 8,460,058 | B2 | 6/2013 | Yoshida et al. |
| 8,852,334 | B1 | 10/2014 | Hills et al. |
| 8,999,056 | B1 | 4/2015 | Hills et al. |
| 9,272,951 | B1 | 3/2016 | Hills et al. |
| 2004/0076470 | A1 | 4/2004 | Goossens |
| 2006/0083589 | A1 | 4/2006 | McClain |
| 2008/0019774 | A1 | 1/2008 | Stenzel |
| 2008/0081217 | A1 | 4/2008 | Bowers |
| 2009/0050018 | A1 | 2/2009 | Kishimoto |
| 2009/0110834 | A1 | 4/2009 | Gimvang |
| 2009/0142604 | A1 | 6/2009 | Imai et al. |
| 2009/0169750 | A1 | 6/2009 | Wilkins et al. |
| 2009/0221212 | A1 | 9/2009 | Palushaj |

OTHER PUBLICATIONS

"Lythic™ Solutions: Products—The Difference in Densifiers™", Lythic Solutions Products: Densifier, Protector, Cleaner, http://thesherwoodgroup.com/websites/lythic/products.html, © 2008 Lythic Solutions, Inc., date unknown, 1 page.

Steven H. Miller, "Concrete Floors make a polished presentation", Seattle Dialy Journal of Commerce, Copyright 2015 Seattle Daily Journal of Commerce, http://www.djc.com/news/co/12005499.html?action+get&id+12005499&printmode_=true, 4 pages, May 1, 2009.

Aquron 2000® Sub-surface Molecular Bonding & Waterproofing Solution Treatment for Concrete Manual, © Markham Distributing © Aquron Corporation, Apr. 2002, 20 pages.

"Colloidal Silica—Silifog®", Lab Korea, http://www.labkorea.com/products/chemical/silica/colloidalsilica.html, ESEL TechTra Inc. Copyright 1998, Oct. 18, 2004, 9 pages.

"Savvy Densifier", ATECH PLUS Concrete Solutions, Atech Solutions Pty Ltd. www.atechproducts.com.au, 2 pages.

Lythic Solutions™ Sales Sheet, "Concrete Curing Agent", Lythic Solutions, Inc., www.lythic.net, date unknown, 1 page.

"Zered Wet Resin Polishing Pad, D-series—SleepWell—PP-D", Diamond Tools from Zered, Inc. Mikury Wire, Metal Pad, Concrete Ploishing Pad, Grinding, http://www.zeredinc.com/Prodcut/ItemDetailView.aspx?ProductID=73&DirName=%20S, © Copyright 2013 Zered, Inc., printed Apr. 15, 2016, 2 pages.

NW Stone Restoration's Proposal dated Sep. 21, 2004, Invoice No. 1562 and Credit Memo No. 1580, NorthWest Stone Restoration, Inc., 3 pages.

Letter to Larry Lindland, SILCO2 International inc., www.nwstonerestoration.com, Brad Sleeper, General Manager, Sustainable Flooring Solutions, May 7, 2007, 1 page.

Invoice No. 0006218-IN to Northwest Stone Restorations from SILCO2 International, Inc., SILCO2 International, Inc., Aug. 23, 2006, 1 page.

CONCRETE CUTTING, POLISHING, AND COLORING TREATMENT SOLUTIONS AND METHODS

CROSS-REFERENCE TO RELATED APPLICATIONS

This application is a continuation-in-part of U.S. patent application Ser. No. 14/725,292, filed May 29, 2015, which is a continuation of U.S. patent application Ser. No. 14/171,608, filed Feb. 3, 2014, which claims priority to U.S. Provisional Application No. 61/759,879, filed Feb. 1, 2013, the disclosures of which are incorporated herein by reference.

TECHNICAL FIELD

The disclosed embodiments relate generally to methods and products for use in treating concrete, masonry, or stone, and, more specifically, for use in the grinding and polishing of concrete.

BACKGROUND

Concrete is a composite material generally defined as a mixture of two components, aggregates and paste. The paste, which typically includes cement, commonly Portland cement, and water, binds the aggregates (sand and gravel or crushed stone) into a rocklike mass as the paste hardens. The paste hardens because of the chemical hydration reaction between the cement and water.

Concrete surfaces have traditionally been polished using a series of finer and finer abrasives to produce a shiny, hard, durable surface. These abrasives may be attached to a machine to move them across the surface. These machines are by nature heavy and normally have a fairly rigid deck which is difficult or at least cumbersome to maneuver.

The majority of concrete slabs are not flat. As machines with fixed abrasives move across the surface, the larger sized grit abrasives extend further down into the undulations on the surface and leave scratches in the low spots. These low spots are very difficult to remove since the abrasive on the next grit of diamond tools only extends outward about half as far as the previous diamond. It therefore cannot reach the low spot created by the abrasive. This issue can often result in exposing the aggregate, because as each diamond is used, it is necessary to drive it down against the surface to try to remove the scratches left from the previous tool. As stock is removed, it requires working either in dust if cutting dry or through a slurry if cutting wet. It is difficult to see what is being accomplished under either condition. If the concrete is hard and the tool being worked with is too hard to fret, then the diamonds will glaze and not remove the previous scratch. If a dry resin bonded diamonds are used, then the scratches fill with resin which comes out later. The end product of dry polished floors is a high gloss with little to no clarity in the floor.

It should be readily apparent from the above that the problems with the grinding and polishing processes are many and varied. Accordingly, there is a continuing need to improve upon existing concrete cutting and polishing systems and methods.

SUMMARY

In some embodiments, the invention is directed to a cutting compound that provides several advantageous in conjunction to stock removal and polishing. The cutting material acts as the abrasive so that the machine does not have to use progressive grits of diamond abrasives applied to the surface of the floor. This compound of the invention is used in conjunction with the shape and angle of the tool according to the method of the invention in order to remove material from the floor while at the same time not producing the traditional scratches. This compound is substantially neutral in pH until it has been activated by a catalyst, such as the high pH of the concrete. The particle size begins a transformation in size due to the catalyst. The benefit of this system is that it doesn't rely solely on the abrasive in the tool to create scratches, but rather, it uses the edge of the tool to literally shave the surface of the concrete to produce an end result. Since it does not create errant and erratic scratches in the floor, there are no scratches to be removed.

Some embodiments are directed to a method for grinding and polishing dried concrete, comprising the steps of: wetting a surface of dried concrete with a solution including amorphous colloidal silica; permitting the colloidal silica to penetrate the concrete surface for a period of time, cutting the surface of the concrete with a bladed or segmented tool having the blade or edge portion at an approximate angle between 30 degrees and 90 degrees relative to the surface of the concrete.

In some embodiments, wetting the surface includes soaking the surface with the amorphous colloidal silica. The method may further include the step of soaking the surface with water or an aqueous solution before wetting the surface with the amorphous colloidal silica. In some embodiments, wherein the process of cutting the surface comprises shaving and removing the surface ridges from the concrete surface. The method may further include the step of applying a densifier to the cut surface. In some embodiments, the method further includes the steps of allowing the surface to dry and applying a coloring product.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF EMBODIMENTS

The disclosed embodiments are directed to methods for grinding and polishing concrete, and tools and compounds for facilitating such methods.

Figure 1:
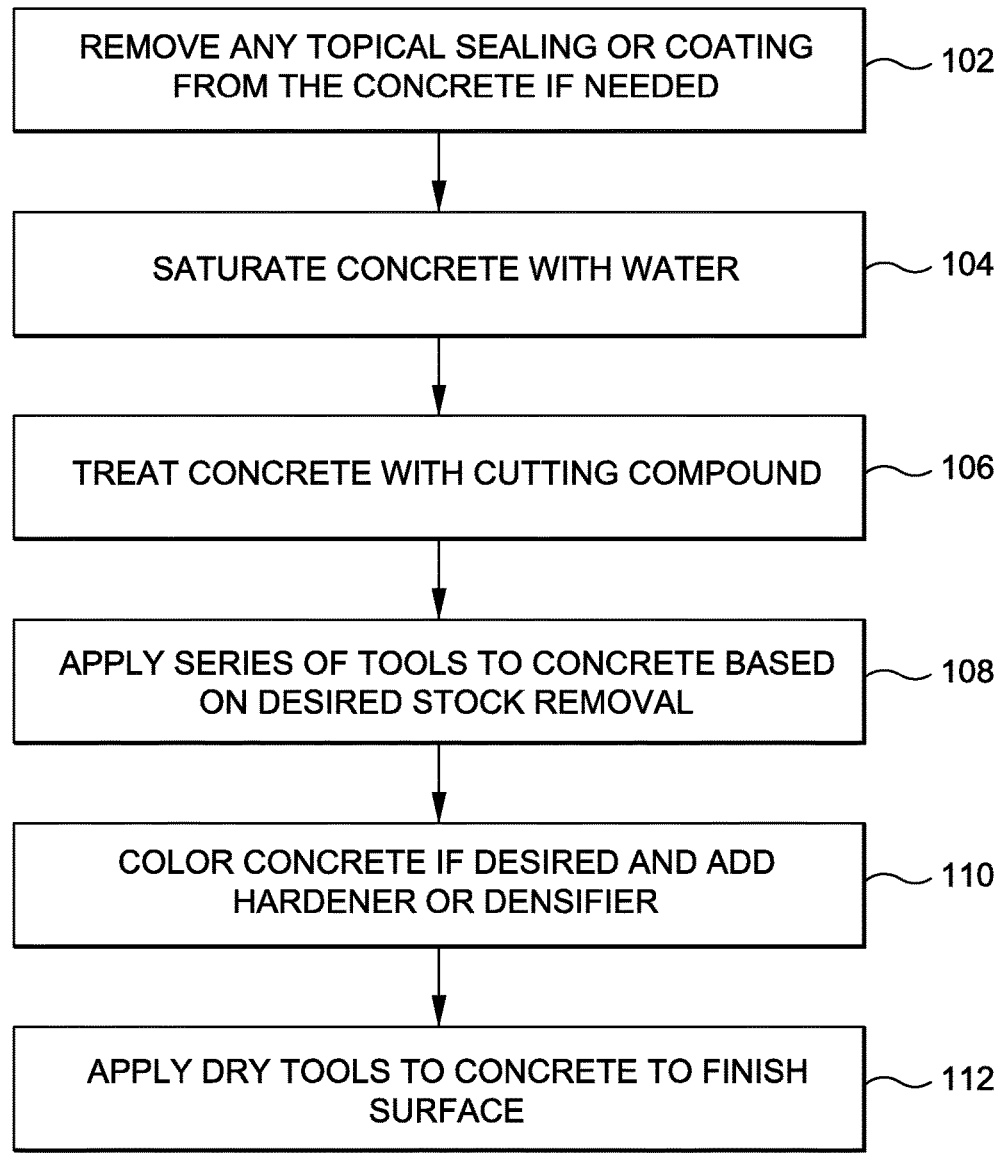
FIG. 1 is a method for finishing and/or repairing concrete, according to one exemplary embodiment.

FIG. 1 is a method for finishing and/or repairing concrete, according to one exemplary embodiment. In step 102 of FIG. 1, prior to beginning concrete finishing/repairing, any topical sealing or coating needs to be removed from the concrete. This may be done using any suitable method including mechanical methods such as grinding or sand blasting the topical coating or sealing from the surface of the concrete. Other methods including chemical methods such as chemical strippers may be used.

In step 104, the concrete is saturated with water. In the disclosed method, much a cutting during the repairing/polishing process should be performed wet. Accordingly, the surface of the concrete is saturated with water to facilitate cutting. The surface is sufficiently saturated based on the depth of cut that is desired. For example, the surface may be water saturated for as little as thirty minutes up to as long as an entire day.

After the concrete has been saturated with water, a cutting compound is applied to the concrete surface, as described in step 106. The compound which may be used according to the non-limiting exemplary methods described herein below may comprise amorphous colloidal silicas and a fluid which exhibits hydrophobic or hydrophilic properties when applied to the concrete. In some embodiments, the colloidal silicas have a particle size which ranges from about 1 to about 10 nanometers. In other embodiments, the colloidal silicas have a particle size which ranges from about 3 nm to about 9 nm. In some embodiments, the aforementioned compound further includes one or more surfactants. Other ingredients may include water, disinfectants and fragrances. In one embodiment, the compound may have a pH value that is substantially neutral without a high alkalinity. In another embodiment, the pH range of the cutting compound may range from 0 to 7. In another embodiment, the pH range of the cutting compound may range from 9 to 13.

Cured concrete may have pores in the size range of 30 nm in diameter, while the particles of the amorphous colloidal silica in solution may be about 7 nm in diameter. In this manner, the particles of the compound can penetrate the pores of the concrete. The concrete typically has larger pores in the aggregate subsurface. The silica particle sizes in some embodiments may thus range from 9 nanometers to 1000 nanometers in size, and penetrate the concrete throughout the aggregate. The solution, which may be water, carries the amorphous colloidal silica into the slab via capillary action through the larger concrete pores. After a period of dwell time, the amorphous colloidal silica has been found to penetrate to about 10 to about 12 mm into the concrete slab.

In some embodiments, other particle sizes may be used. For example, the particle sizes of the colloidal silica may be as large as 100 nm or higher. The particles within the concrete act as an abrasive during the shaving/polishing process described below. Thus, when the particles sizes are configured to be larger, more material may be easily removed during the shaving process.

In some embodiments, other compounds may be used. For example, colloidal silicates may also be used in the cutting compound. The colloidal silicates may be hydrophilic, or water soluble. When colloidal silicates that are hydrophilic are used, the silicates may form a hardened silica film on the surface of the floor. This creates a flat surface (filling voids or any remaining scratches in the concrete). The disadvantages of the silica film include that the hardened top film may be prone to detach from the concrete due to the water solubility of the film. In some embodiments, the colloidal silicates which are typically hydrophilic may be treated with organo silane or siloxane to exhibit hydrophobic properties.

Other compounds may also be used with the disclosed methods herein. Such compounds may include organic or inorganic compounds of silicon, including silicates, siliconates, fluorosilicates, siloxanes, silazanes, halosilanes or combinations thereof. These elements may be provided in a solution of liquid. These compounds may be provided individually or in combination in any ratio or concentration.

The cutting compound described herein may be applied by scrubbing the compound into the floor via a manual, automatic, or semi-automatic scrubber. This helps the compound to penetrate the concrete. The scrubbing process additionally agitates the compound to activate the product to being to break up the cement. The compound applied to the concrete may be allowed to soak for a period of time, such as thirty minutes.

After wetting the concrete slab with the solution containing one embodiment of the above-described cutting compounds, the method then includes the step of "shaving" the concrete by applying one or more tools to the concrete based on the desired amount of stock to be removed, as shown in step 108 of FIG. 1. The term shaving is given is ordinary meaning in the art, namely removing a top layer while minimizing scratching, tearing, or otherwise breaking apart the remaining surface and underlying material.

Figure 2:
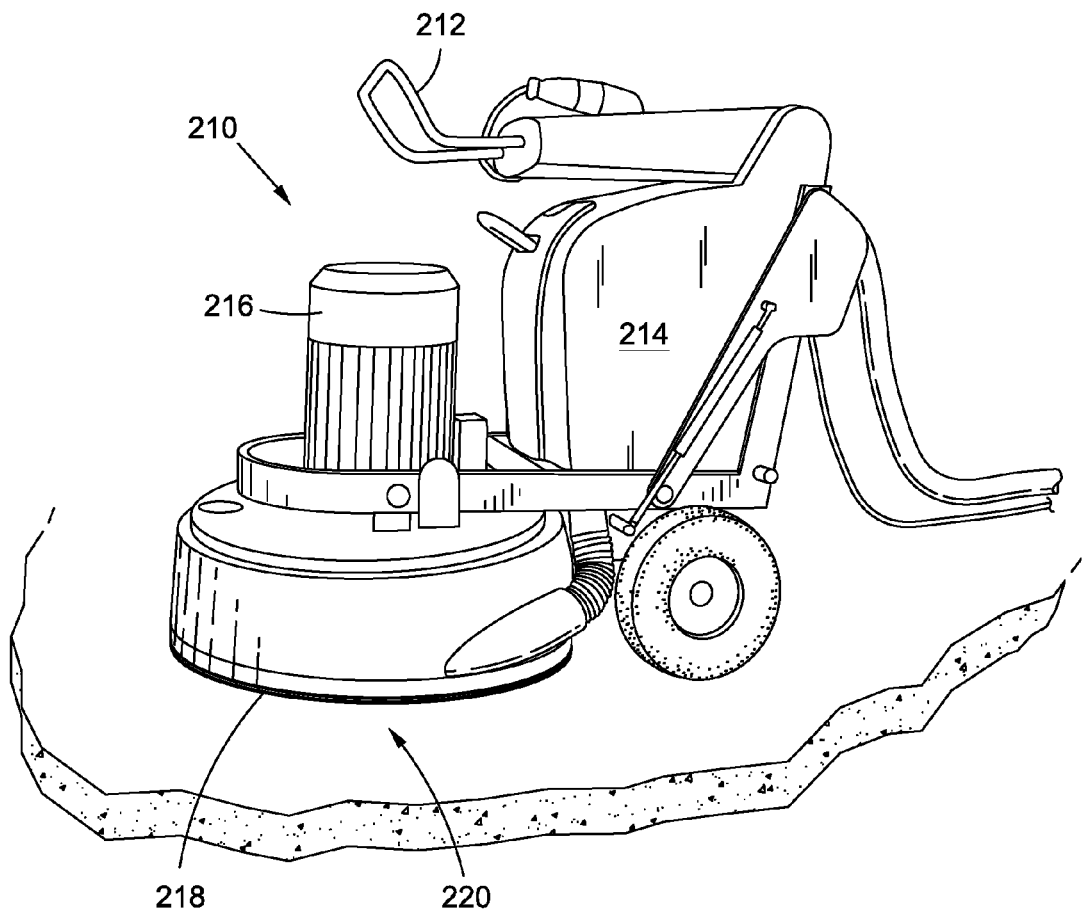
FIG. 2 shows an exemplary machine for applying tools to the surface of the concrete.

FIG. 2 shows an exemplary machine for applying tools to the surface of the concrete. In FIG. 2, the machine 210 for applying tools to the surface is illustrated as walk-behind type machine, however other similar machines such as ride-on or remotely controlled machines may also be used. The machine 210 comprises a housing assembly 214 that is coupled to and extends from a handle 212. The housing assembly 214 and the handle 212 provide the main structure of the machine 210. The handle 212 may include controls for the operation of a motor 216 which propels a drive mechanism 218. The drive mechanism supports a resurfacing tool disposed on the bottom 220 of the machine 210, which will be described in more detail below. The handle 212 also aids in supporting a user during operation of the machine 210.

The housing assembly 214 is the main unit that provides structural support for the machine 210 components and provides protection and air flow during operation of the machine 210. The housing 214 supports the motor 216 positioned on the housing assembly 214 and includes a drive mechanism 218 connected to the motor 216. The motor 216 may be any form of motor that provides mechanical force to the drive mechanism 218. The motor 216 may be an internal combustion engine, an electric motor, or a pneumatic motor. The drive mechanism 218 is configured to provide rotational motion and extends downward from the motor 216 and into the housing assembly 214. The drive mechanism 218 may include such components such as rods, rotational joints, bearings, and one or more belts to drive the cutting tool.

The tool blade or edge of the disclosed embodiments is configured with a blade or edge such that it removes "peaks" of the material without affecting the "valleys" of the material, thus polishing and evening the surface of the material, such as concrete. In traditional methods, tools are used that become round and deformed by the material, such as concrete. In the example of cutting concrete, the sand, aggregate, and fiber in the concrete are harder than the bond of traditional tools. As a result, traditional methods rely exclusively on the diamond face of the tool. Thus traditionally, the focus of the tool was on the diamond face abrasive. In the present embodiment, the cutting compound keeps the edge of the tool at a desired profile, and thus the cut may be more accurately controlled.

The application of the tool also applies pressure to the solution wetting the concrete surface as described above, which further facilitates driving the amorphous colloidal silica deeper into the slab. It has been found that the amorphous colloidal silica will penetrate as much as 18 mm into the concrete slab with the application of pressure.

Once into the slab, the amorphous silica has been found to crosslink with the lime, Portland cement, calcium hydroxide, portlandite, silica, sodium silicate and any other high pH compounds it encounters in the slab, thus hardening the slab. In addition, the amorphous silica will link with the concrete shavings and dust, thus reducing dust in the atmosphere while also further hardening the concrete slab.

The blade or edge of a tool is applied to the surface of the wetted concrete slab at an angle, which may be from about 1 degree to about 90 degrees relative to the plane of the surface, but is preferably between 30 degrees and 50 degrees relative to the plane of the surface. It has been found that by implementing various shapes or edge profiles on the leading edge of the tool, the type of cut, the depth of cut, and the primary surface texture of the concrete slab resulting from the cut can be controlled. This contrasts with traditional prior art abrasive cutting tools that operate primarily by abrasives within the tool that scratch against the surface. The scratching may occur randomly as the abrasive is randomly located in a pad, and the machine may move the pad in a random or orbital pattern. Thus, in traditional methods, a series of finer and finer abrasives must be used in succession to achieve a desired result. In contrast, as few tools as a single tool can be used to remove as much stock from the floor as needed by using the shaving process described herein.

Figure 3:
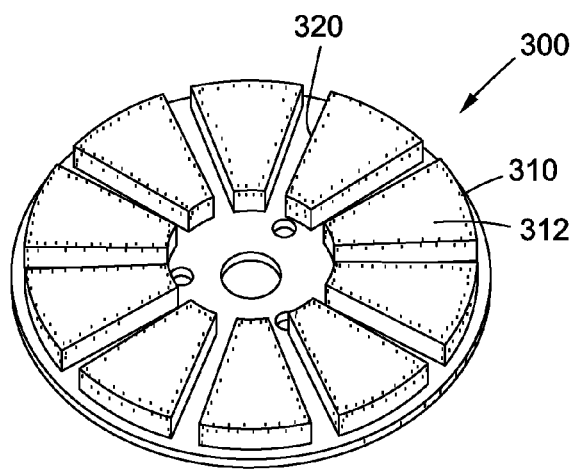
FIG. 3 is a tool for cutting, repairing, and/or polishing concrete, according to an exemplary embodiment.
Figure 4A:
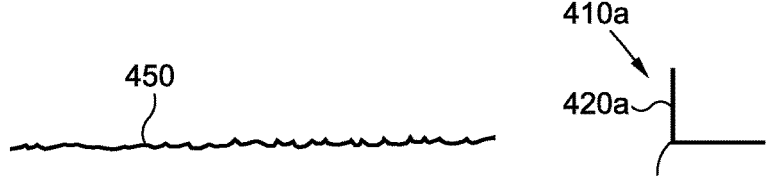
FIG. 4A, FIG. 4B, FIG. 4C, FIG. 4D, FIG. 4E, and FIG. 4F show exemplary tool elements with exemplary tool edges.
Figure 4B:
Figure 4C:
Figure 4D:
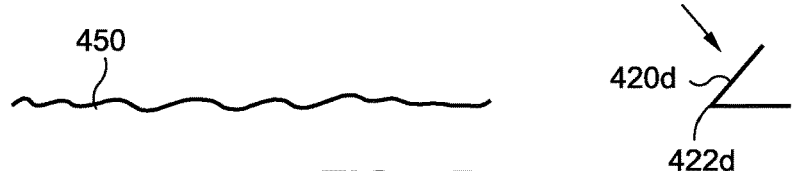
Figure 4E:
Figure 4F:

An exemplary tool is shown in FIG. 3. In FIG. 3, a tool 300 comprises several tooling elements 310 comprising an abrasive body 312 and a leading edge 120. In FIG. 3, the tooling elements 310 are shown in a trapezoidal shape, though any number of other shapes may be used, such as rectangular, triangular, etc. The tool may be connected to a machine, such as the machine 210 shown in FIG. 2, to move the tool 300 relative to the concrete surface.

FIG. 4A-FIG. 4F show exemplary tool elements with tool edges. In one example, a tooling element 410a may comprise a leading edge 420a at a 90-degree angle from the concrete surface 450. The leading edge 420a may include a sharp tooling surface 422a. In other embodiments, tooling elements 410b, 410c have leading edges 412b, 412c with tooling surfaces 422b, 422c that have a radiused edge and a chamfered edge, respectively. In further embodiments, tooling elements 410d, 410e, 410f have leading edges 412d, 412e, 412f that are at an angle other than 90 degrees from the surface 450 of the concrete.

By controlling the angle, chamfer, or radius of the tool edge, the primary surface texture and the amount of material removed may be controlled. In one example, a sharp, 90-degree tool results in a cut that gouges and fractures the concrete as is passes over the concrete. A radiused edge is configured to cut without gouging. A chamfered edge at 45 degrees from the surface performs a cut that does not gouge as it cuts the surface of the concrete. Other more aggressive shapes may include a trapezoid shaped tool with 90 degree edges all around the tool. Tools with different edges may be formed to also include abrasive materials to control a secondary surface texture and surface removal. Further, it has also been found that abrasives may be removed from the tooling elements, such as diamond abrasives, without decreasing the effectiveness of the tool when the leading edge of the tool is shaped as discussed herein.

The tools may be constructed based on the type of edge desired as well as according to the desired application. For example, the tool may be formed of a metal via powder metallurgy techniques where the powder is impregnated with diamond abrasives. In other embodiments, a metal tool may be formed through forging or casting methods. Other materials may also be used such as ceramic tools or resin-based tools including resins impregnated with metals.

As opposed to traditional abrasive tools used in the industry, it does not matter if a 30-grit tool or a 400-grit tool is used, and no progressive use of grits is needed to achieve a desired amount of stock removal. In traditional tools, the tool functions mainly through the abrasives that are encapsulated in the bond of the tool. Thus, the tool only creates scratches into the surface that are the size of the abrasive. For example, a 30-grit tool will only create a 30-grit scratch. Once the tool achieves a consistent 30-grit scratch it will not remove any more material. Further, when the tool is not exposing fresh material, then the surface heats causing the tool to glaze and not take any more material from the surface. With the cutting compound and bladed or segmented tool disclosed herein, material removal is controlled by the leading edge of the tool and not the abrasives embedded therein, allowing for a more predictable and controlled finish of the cut and/or polish. Further, because the stock removal is not based on the grit of the tool, fewer tool passes are needed to remove the desired amount of stock, cutting costs and increasing efficiency.

The amount of stock removal may further be controlled by other factors such as the weight of the machine to which the tool is attached. The speed of the machine may also be optimized for a desired amount of stock removal with the tool.

If heavy aggregate exposure is desired, then starting with a metal bonded rectangular tool is appropriate. If a surface cream polish is desired, then starting with a chamfered ceramic tool is appropriate. The angle that the tool addresses the surface of the concrete will determine the amount of material that is removed. Once a starting tool is selected, an appropriate sequence of tools is used to achieve the desired results. For heavy stock removal, such as for large aggregate exposure, a tool that has a 90-degree edge to the tool such as a tool shaped with rectangles, squares, straight edge, rhombus, or any metal bonded tool where the edge comes straight down and the face on the floor creates a 90-degree edge is appropriate. For moderate stock removal, a tool that has a rounded edge on the outside of the tool and a 90-degree edge on the inside of the tool is appropriate. The rounded edge does not gouge the surface and the 90-degree interior edge still removes a significant amount of stock. For light stock removal, a chamfered edge of less than 90 degrees is appropriate. An interior edge of 90 is still acceptable but not necessary.

As one example of a traditional tool sequence, the first tool might be a 6-grit metal bonded tool. This is followed with tools that double the grit each pass. Such a succession of tools might include metal bonded 16-grit, 24-30 grit, 50-70 grit, 100-grit, 100 grit semimetal 200-grit resin, 400-grit, 800-grit, and 1600-grit. In contrast, using the disclosed method, a maximum of four tools may be used achieving the same result. For example, the first tool might be a 6-grit tool with a trapezoidal shaped 90-degree edge; which is followed by a 100-grit, 10 segment tool with a radiused edge; a 400-grit semi-metal tool; and last an 800-grit dry polish. Other grits and tool edges may be used depending on the amount of the aggregate that is intended to be exposed during the polishing/resurfacing process. For example, if less material is to be removed, three tools starting with the 100-grit, 10 segment may be used. Thus, as compared to traditional methods, labor may be reduced by a minimum of 50%. Further, the resulting surface finishing will be of a higher quality than those made using traditional methods.

The amount of material removed during the cutting step (step 108 of FIG. 1) may depend upon the type of finish desired. For example, no aggregate exposure will require one series of tools, salt and pepper aggregate exposure will require a second series of tools, and large aggregate exposure will require a third series of tools.

Traditional methods require hard, medium, and soft bonds to effectively remove stock, which require knowledge of the hardness of the slab in order to properly pick the proper tool to do the work. Hard bonded tools are required for soft concrete and soft bonded tools are required for hard concrete. If a hard-bonded tool is used on hard concrete, then the tool will glaze and will not work. Also, if the tool runs too fast, then it will heat up and glaze. If a soft tool is run on soft concrete, then it will wear out very quickly. With the cutting compound used in the disclosed embodiments, it is not necessary to know the hardness of the concrete. It is not as important to know the hardness of the concrete in the first steps. It is not necessary to use a soft bonded tool. This contrasts with using dry tools (such as in the polishing step described below) where it is imperative to know the hardness of the concrete because such tools, for example resin tools, are susceptible to glazing.

The bladed or segmented tool in combination with the cutting compound can be used on both a new concrete slab and an existing concrete slab. The cutting compound penetrates the surface of either the new or existing concrete slab, and the cutting tool shaves layers of concrete from the slab to remove surface impurities or surface defects and create a new hardened surface. New concrete may be defined as freshly placed concrete. Existing, or dried concrete may be defined as concrete that has been allowed to cure for 72 hours or greater.

In some embodiments, a portion of the removed concrete mixes with the cutting compound, such as the colloidal silica, and forms a slurry that bonds back to the surface of the concrete. Thus, the methods described herein are not only used to grind and polish concrete, but also to refinish the surface of an imperfect or damaged slab of concrete. In some embodiments, cement, such as Portland cement, may be added to the slurry during refinishing for situations where damage to the slab, such as rain damage, has washed away or damaged some or all of the existing cement from the slab. In one example, Portland cement may be applied to the surface of the concrete and mixed with the cutting compound and/or slurry to fill in defects or otherwise repair damage to the concrete.

The cutting compound reduces the labor required to grind or polish the floor. Because the tools are configured such that the leading edge essentially shaves layers of the concrete off the top rather than scratching the concrete via an abrasive, a smooth surface can be created in very few passes. This is because the tools only remove the "peaks" in the surface of the concrete while leaving the "valleys." Traditional methods require a diamond abrasive tool used in succession where the next tool used has a diamond abrasive that is half as large as the previous diamond. These abrasives, unlike the presently disclosed tools that shave only peaks of the concrete, introduce new valleys into the surface. The diamond abrasive rips and fractures the surface of the concrete, because it is harder than the material that it is cutting. The result is an increase in the concentration of fractured aggregate and subsequent roll out from the polished surface. The surface eventually becomes more uniform as the abrasives become smaller, but this requires many passes with tools having incrementally smaller and smaller abrasives. Thus, the prior art methods are more labor intensive and require more material costs due to the use of more power or fuel to power the machine and numerous prior art polishing pads are consumed during use.

Returning to FIG. 1, after the series of tools has been applied to achieve the desired stock removal and initial surface finish, a coloring agent may be added to the concrete if desired, and a hardener or densifier is applied, as shown in step 110. Color may be added to the concrete using a coloring product as described herein. In some embodiments, the coloring product includes the materials as shown in Table 1.

TABLE 1

| Ingredient | % | CAS # | OSHA | ACGIH | OTHER |
| --- | --- | --- | --- | --- | --- |
| Silica, amorphous, precipitated | 10-15% | 7631-86-9 | 80 mg/M$^3$/% SiO$_2$ | | 10 ppm |
| 2-Butoxyethanol | | 111-76-2 | 50 ppm | 20 ppm | N/A |
| Glycol Ether DB | | 112-34-5 | 50 ppm | 20 ppm | N/A |
| Glycol Ether EP | | 2807-30-9 | Not Established | Not Established | |
| propan-2-ol | 5-7% | 67-63-0 | 400 ppm | 400 ppm | |
| Cr (III) (complexed in dye | 2-5% | 7440-47-3 | 0.5 mg/m$^3$ | 0.5 mg/m$^3$ | |
| Water | 60-70% | 7732-18-5 | Not Established | Not Established | N/A |

Coloring products, such as those described herein, can be used with any carrier to impart color into concrete, such as water, acetone, or chemical densifiers. In some embodiments, the coloring may be added along with the densifier in step 110 of FIG. 1. In other embodiments, the color may be added along with the cutting compound in step 106 of FIG. 1. One advantage of a coloring product used with the cutting compound described herein is that it may be 100% miscible and hydrophilic. If there is water in the slab, which is quite common, then the other materials that use a salt as a pigment are pushed out of the slab. If the relative humidity of the air is lower than the relative humidity of the slab, then the moisture will leave the slab and move into the air. If a pigment has been used to color the slab it will leave with the water. Another advantage to the coloring products used with the cutting compound is that they can be driven along with the silica of the compound into the concrete. This is because the silica is porous and clear, the coloring product colors the silica, and the silica penetrates the slab. The depth of penetration can be as much as about 10 mm to about 12 mm into the concrete slab, but may be greater. A non-limiting exemplary method of use of the coloring product is described as follows:

1. Cut until floor is smooth. Two passes with a head speed of 3-400 rps is sufficient.
2. Apply the coloring product at a rate of 400 square feet per gallon. The floor should preferably be dry prior to application of this material.

3. Apply a low pH colloidal chemical hardener to the floor at 400-600 square feet per gallon, leaving the product on the floor for at least 30 minutes.

Once the hardener or densifier has been applied along with any desired color, dry tools are applied to the concrete to complete the finish of the concrete surface as shown in step 112 of FIG. 1. The cutting compound will not easily cut after it has dried into the concrete. It will however polish. In one embodiment, the surface may be dry polished using an 800-grit tool. In another embodiment, the dry polish may be completed with a 1500 grit phenolic resin tool.

Once the process is complete, the surface may be scrubbed and cleaned if necessary, and optionally sealed. A colloidal silica sealer for stained and polished concrete may be used in one embodiment. More than one coat of sealer may need to be applied. A silica blended guard mixed with water at a rate of 2000 square feet per gallons may be used being applied with a typical garden sprayer and a microfiber applicator. The entire process may be completed by burnishing the floor with a hog's hair or black pad.

In some embodiments, a dry resin may be applied as the last step to produce a high polish and to seal the surface. The seal of the surface may then be tested by applying water to the floor and letting it sit for approximately three minutes. If the area occupied by water becomes darker, then the water has penetrated the area.

It has been found that the above-described surfacing method (using the cutting compound with tools that take advantage of the leading edge) provides a higher quality finish that traditional methods for at least two reasons. First, when the tool cuts along the surface of the concrete, the tool does not fracture the aggregate. In other words, the tool can cleanly cut through the concrete without introducing new gouges or valleys into the concrete. Second, the tool can cut through both the cement and the aggregate at the same rate, because the primary abrasive is contained in the cutting compound. The compound fills the valleys in the surface only allowing the peaks to be shaved by the edge of the tool. Since the size of the particles are substantially uniform, the amount of fill across the voids is also uniform. The amorphous silica provides the abrasives to remove the aggregate, but the abrasives are free floating in the compound as opposed to being fixed within a tool. Thus, the abrasives do not produce any particular pattern. When the abrasive moves across a surface it does not fracture the cement and aggregate. The tool is harder than the surface of the slab, so it cuts it. The pores of the concrete are supported by the amorphous silica; therefore, the concrete is prevented from breaking down during the cutting process. The combination of these effects results in a superior finish than compared with traditional surfacing methods.

Because of the ability to cleanly shave off the surface without fracturing the aggregate, the method described herein may be used to flatten existing concrete. This flattening process may be used without removing a large amount of material. This is because the process can shave off high areas without introducing new holes or valleys into other areas of the concrete. Using the edge of the tool as described herein, a high grit tool, such as an 800-grit metal tool may be used to flatten the surface. In other words, the shaving and cutting performed by the disclosed embodiments is shaving the material from the top down rather than scratching and fracturing the surface with incrementally finer grit tools.

By using the above method, an auditable roughness average (RA) of the surface of the concrete may be obtained. In prior methods, resin based tools leave a film on the surface of the concrete, so the RA of the concrete itself is indeterminable. A further drawback of the prior art is that the resin can interfere with or block subsequent sealing, coloring, or other such surface treatments. The resin can also cause glazing and cracking which degrades the surface finish and polish level. However, by the present methods, an RA of 6 or less may be achieved. In some embodiments, an RA of less than 1 may be achieved. The surface of the concrete also has a relatively high distinction of image reading and a low haze reading. For example, the method has been found to achieve a distinction of image reading of up to 100% and a haze reading in the low single digits.

The cutting compound of the invention does not require a heavy piece of equipment to remove significant amounts of stock from the slab. The cutting compound is more effective than water at maintaining a wet surface to facilitate cutting. That is, the compound penetrates deeper into the concrete than water and does not dry out as quickly as water. Because the concrete better maintains this "wet" condition with the cutting compound, the concrete can be cut more easily. Surface temperatures are also reduced and thus the tool abrasives do not glaze.

It will be appreciated by those skilled in the art that while the invention has been described above in connection with particular embodiments and examples, the invention is not necessarily so limited, and that numerous other embodiments, examples, uses, modifications and departures from such embodiments, examples and uses are all intended to be encompassed by the spirit and scope of the invention as described herein and would be understood to one of ordinary skill in the art.

What is claimed is:

1. A method for finishing or refinishing concrete, the method comprising the steps of:
    saturating a surface of the concrete with water;
    wetting the surface of the concrete with a cutting compound, the cutting compound comprising particles that penetrate pores in the surface of the concrete;
    applying at least one tool having a predetermined cutting edge to the surface of the concrete while the surface of the concrete is wet; and
    after the surface of the concrete dries, applying at least one dry tool to polish the surface of the concrete.

2. The method of claim 1, further comprising removing a sealant or coating from the concrete prior to saturating the surface of the concrete with water.

3. The method of claim 1, further comprising adding a coloring agent and a densifier after the step of applying at least one tool to the surface of the concrete.

4. The method of claim 1, wherein the cutting compound comprises a colloidal silica.

5. The method of claim 4, wherein the particles of the colloidal silica have a size of about 7 nm.

6. The method of claim 4, wherein the particles of the colloidal silica have a size ranging from 9 nm to 1000 nm.

7. The method of claim 1, wherein the predetermined cutting edge is applied to the surface at an angle between 30 degrees and 90 degrees relative to the surface.

8. The method of claim 1, wherein the predetermined cutting edge is at least one of a sharp edge, a chamfered edge, and a radiused edge.

9. The method of claim 1, wherein the at least one tool comprises a tool body that includes abrasives.

10. The method of claim 1, wherein the at least one tool comprises a tool body that omits abrasives.

11. The method of claim 1, wherein the step of applying at least one tool includes a series of tools comprising a 6-grit tool with a trapezoidal shaped 90-degree edge; a 100-grit, segment tool with a radiused edge; and a 400-grit semi-metal tool;

and the dry tool comprises an 800-grit dry polish.

12. The method of claim 1, wherein the at least one tool comprises at least one of a trapezoidal, rectangular, and triangular shape.

13. The method of claim 1, wherein the at least one tool is applied by a machine, the at least one tool being attached to a drive mechanism propelled by a motor on the machine.

\* \* \* \* \*